April 28, 1964 — M. FISCHER — 3,130,906
STATISTICAL SHOCK INDICATOR AND REGISTER
Filed Nov. 13, 1961
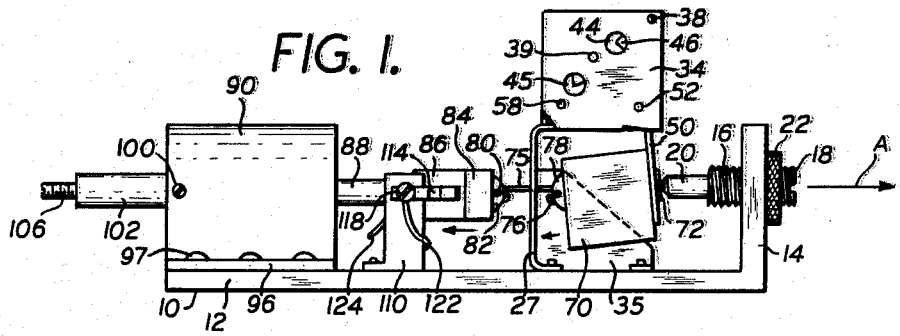
FIG. 1.
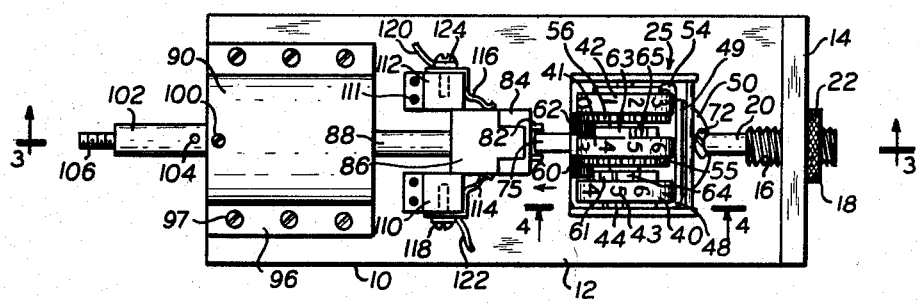
FIG. 2.
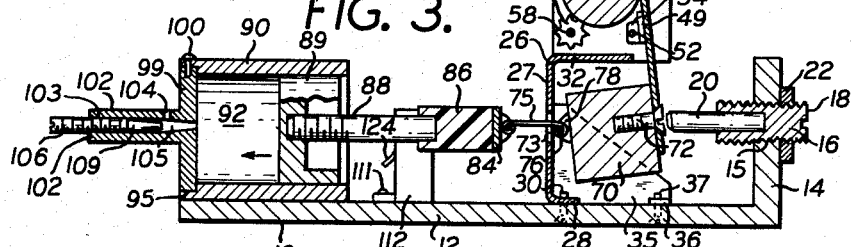
FIG. 3.
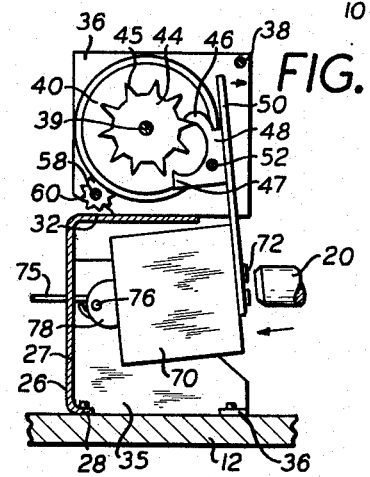
FIG. 4.
FIG. 5.
INVENTOR
MURRY FISCHER
BY
J. B. Burke
ATTORNEY.

United States Patent Office 3,130,906
Patented Apr. 28, 1964

3,130,906
STATISTICAL SHOCK INDICATOR AND REGISTER
Murry Fischer, Spring Valley, N.Y., assignor to Inertia Switch Inc., New York, N.Y., a corporation of New York
Filed Nov. 13, 1961, Ser. No. 151,892
10 Claims. (Cl. 235—91)

This invention relates to an inertia-operated shock indicator and register.

According to the invention, there is provided a mechanism including a mechanical digital counter which is lever-operated. The lever actuates a gear train under control of an escapement member to turn numbered dials of the counter. A mass is secured to the lever which is pivotally carried by the counter. An adjustable magnet supported in a frame of the device is located near the mass to attract and hold magnetically a magnetic element forming part of the mass. When the mass is pivotally displaced against the holding force of the magnet, the counter is actuated and registers one count representing one inertia-actuated displacement of the mass and a return displacement to initial holding position. The frequency of response of the device to repeated shocks is controllable by an adjustably damped dashpot associated with the mechanism and connected to the mass. The dashpot may be provided with an air release orifice and valve to regulate the rate at which air is admitted to or escapes from the dashpot. The counter dials and associated gear train have an inertia which acts in conjunction with the inertia of the mass and damping of the dashpot. The magnitude of accelerating force which is required to actuate the mechanism and counter is varied by adjusting the proximity of the magnet to the mass and counter lever. The device may include a pair of electrical brushes carried on the frame of the device. These brushes may serve as terminals of an external electric circuit. The dashpot has a shaft connected to the lever of the counter. On this shaft is an insulator and a metal shorting contact frictionally engageable by the brushes to close the circuit between the brushes when the lever is pivoted by an applied force. Since the device is inertia-operated, it requires no electric power to actuate the counter.

It is therefore a principal object of the invention to provide an inertia-operated statistical shock recorder or register.

A further object is to provide an inertia-operated shock counter in which mechanically moving parts of the counter have an inertia which acts in conjunction with the inertia of a pivotally-mounted mass and lever, and with the damping of an associated dashpot, to determine the frequency of response of the counter to repeatedly applied acceleration forces.

Another object is to provide a device of the type described, wherein a magnet is adjustably disposed in proximity to the mass and lever for determining the magnitude of accelerating force required to displace the mass and thereby actuate the counter.

The invention will be best understood from the following detailed description taken together with the drawing, wherein:

FIG. 1 is a side elevational view of a device embodying the invention.

FIG. 2 is a top plan view of the device.

FIG. 3 is a longitudinal sectional view taken on line 3—3 of FIG. 2.

FIG. 4 is a fragmentary sectional view on an enlarged scale taken on line 4—4 of FIG. 2.

FIG. 5 is a front end elevational view of the device.

Referring to the drawing, there is shown a frame 10, including a rectangular base plate 12 and upstanding front end wall 14. A threaded hole 15 is provided in wall 14. In this hole is adjustably screwed an externally threaded plug 16 having a slotted outer or front end 18. In the rear end of the plug is seated a cylindical permanent magnet bar 20. A locknut 22 may be threaded on the front end of the plug to lock the magnet in a selected position of axial extension perpendicularly to the rear side of wall 14.

A counter mechanism 25 is mounted on the base plate 12. This mechanism includes a bracket 26 which has a vertically disposed rear plate or wall 27 having ears 28 formed at the bottom and secured by screws 30 to the plate 12. The bracket has a horizontally bent partition 32 integrally formed with two laterally spaced walls 34, 36. A vertically disposed wall panel 35 is bent forwardly from wall 27 and is provided with ear 36 and screw 37 to effect a rigid mounting of the bracket on plate 12.

Walls 34, 36 are connected by a horizontal transverse bar 38. A shaft 39 extends across the counter between walls 34, 36. On this shaft are rotatable dials or wheels 40, 41, 42. Numerals 43 are engraved or molded in the exterior surfaces of the dials. A ratchet gear 44 is rotatably mounted on the shaft 39. This gear has teeth 45 engaged by either upper tooth 46 or lower tooth 47 of a pawl 48 which constitute an escapement; see FIG. 4. The pawl has an extension 49 bent perpendicularly to the plane of the pawl and secured to a flat rectangular lever 50. A pintle 52 extends across the counter between walls 34, 36 and pivotally supports the pawl and lever. The pawl extension has ear 54 engaged with one end of the pintle 52 at wall 36.

The counter device includes a gear train in addition to the escapement for advancing each dial one step after a preceding dial completes a full revolution. Gear 44 rotates with dial 40. Gear 55 rotates with dial 41. Gear 56 rotates with dial 42. On a shaft 58 extending across the counter are two star gears 60, 62 having ten teeth each. These gears engage the gears 55 and 56, respectively. The gears 55, 56 and 60, 62 are held stationary by abutment of one tooth of each of gears 60, 62 on annular axial extensions 61, 63 of dials 40, 41. The annular extensions each have single recesses 64, 65 formed therein.

As recess 64 on extension 61 comes around to gear 60, it turns this gear one tooth which, in turn, causes gear 55 to turn one tooth so that wheel 41 turns through 36° or one-tenth of a revolution. When recess 65 on wheel 41 comes around to receive a tooth of gear 62, it turns this gear one tooth, which turns gear 56 and dial 42 through 36°. It will thus be apparent that each time dial 40 completes one revolution it advances dial 41 one step, and each time dial 41 completes one revolution it advances dial 42 one step. The dial 40 is advanced one step each time the lever 50 completes a back and forward motion.

Lever 50 carries a massive rectangular metal block 70 at its lower end. The block extends rearwardly of the lever below partition 32. A magnetic metal screw 72 secures the block 70 to the lever. The lever may also be magnetic. The block is preferably non-magnetic, and may be made of brass, bronze, or other heavy metal.

In the rear of bracket wall 27 is a hole 73. A link 75 passes through this hole. The forward end of the link is engaged on a pintle 76 carried by ears 78 extending rearwardly of the block 70. The rear other end of the link engages pintle 80 carried by ears 82 extending forwardly of the bight of a U-shaped conductive metal contact element 84.

Element 84 is rectangularly U-shaped and is secured to an insulated coupling member 86. A shaft 88 has one end secured in the coupling member 86. The other end of the shaft is anchored in a cup-shaped piston 89 movable in a dashpot 90. The dashpot has a cylindrical chamber 92 formed inside a tubular frame. The dashpot has external flanges 96 extending laterally and secured by screws 97 to plate 12. A circular rear wall 99 is secured in a recess 95 in the rear end of the dashpot by screws 100.

Wall 99 has a tubular extension 102 with an axial threaded bore 103 terminating in a tapered axial passage 105, and a lateral hole 104 opening into the tapered passage 105, so that the chamber 92 communicates with the exterior of the dashpot through passage 105 and hole 104. A screw 106 is threaded in bore 103. The screw has a tapered end 109 which extends into tapered passage 105. The screw serves as a valve member for adjusting the flow of air through the hole 104 and passage 105 to and from chamber 92.

Two stationary posts 110 and 112 are secured to plate 12 by screws 111. These posts are insulated members on which are secured flexible wiper contact elements or brushes 114, 116 held by screws 118, 120. Electric wires 122, 124, which may be terminals of an external electric circuit, may be secured in electrical contact with the brushes 114, 116 by the screws 118, 120. The brushes frictionally engage element 84 and member 86.

In operation of the device, the lever and attached mass will pivot on pintle 52 in response to the force of acceleration of sufficient magnitude applied to the entire device in a rearward direction, as indicated by arrow A in FIG. 1. The magnitude of force required to displace the mass and lever from the forward position shown in FIGS. 1 and 4 will be determined to a large extent by the spacing of the free end of magnet 20 from the magnetic element 72. When the massive block and lever are displaced rearwardly, the lower tooth 47 of the pawl moves rearwardly and engages the adjacent tooth 45 of gear 44 and advances the ratchet gear 44 and dial 40 one-half step, or 18°. When the force of acceleration is passed, the force of attraction of the magnet retracts the lever and block forwardly so that the upper tooth 46 then engages an upper tooth of the gear 44 and completes the second half-step of the 36° rotation of the gear 44 and dial 40. The gear 44 is then held stationary by the upper tooth 46 of the pawl while the block 70 and lever are held forwardly by the magnet 20.

If mechanical shocks or forces of acceleration are repeatedly and rapidly applied to the mechanism in direction A, the device will respond to each force which has sufficient magnitude. The device has a maximum frequency of response determined by the combined inertia of the mass of the block, lever and gear train, the damping of the dashpot as the piston moves back and forth in chamber 92 against pressure of air on opposite sides of the piston, and the frictional engagement of the brushes 114, 116 with contact 84 and insulator 86. The damping force limiting rate of oscillation of the piston will be controllable by adjustably setting the screw 106 in tubular dashpot extension 102.

The invention makes it possible to register or count repeated mechanical shocks provided they have predetermined magnitude and occur at less than a predetermined repetitive rate or frequency. In addition, the invention makes it possible to close and then open an external electric circuit each time a complete oscillation of the movable mass occurs.

It should be noted that movement of block 70 and lever 50 is resisted by the force of attraction of magnet 20; and the magnet exerts a restoring force on the block. This arrangement makes it possible for the device to operate with base plate 12 in a vertical plane and every other plane including a horizontal plane. The lever and block will move in a horizontal plane if plate 12 is vertical, subject to horizontally directed forces of acceleration and magnetic attraction, and independent of the vertically directed force of earth gravity. Even if block 70 and lever 50 are disposed to move in a vertical plane as illustrated in the drawing, the force of attraction exerted by magnet 20 may be made so much greater than the combined weight of block 70 and lever 50 that the vertically directed force of earth gravity has a negligible effect in influencing movement of the block and lever, as compared with the larger horizontally directed magnetic force of magnet 20 exerted in the horizontal direction of acceleration.

What is claimed and desired to protect by Letters Patent is:

1. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, and a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count substantially independently of any vertically directed gravitational force exerted upon said block and lever.

2. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, and a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count, said magnet being axially adjustable in said support so that the spacing of the magnet from the block and lever may be set to predetermine the minimum magnitude of accelerating force required to completely displace said lever and mass in said one direction substantially independently of any vertically directed gravitational force exerted upon said block and lever.

3. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count, said magnet being axially adjustable in said support so that the spacing of the magnet from the block and lever may be set to predetermine the minimum magnitude of accelerating force required to completely displace said lever and mass in said one direction, said counter including a plurality of dials rotatable by a gear train, said gear train being operatively connected to said lever, said gear train having an inertia to displacement supplementing the inertia of said lever and block, whereby the maximum frequency at which said lever may be displaced by repeated accelerating forces is determined by the combined inertia of said dials, gear train, lever and block substantially independently of any vertically directed gravitational force exerted upon said block and lever.

4. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count, a dashpot mounted on said support, said dashpot having a piston movable in an air chamber, and linkage means connecting said piston, mass and lever to move simultaneously in said one direction when the accelerating force is applied, said dashpot having a damping characteristic effective in conjunction with inertia of said mass and lever to determine the maximum frequency at which said lever may be displaced by repeated accelerating forces substantially independently of any vertically directed gravitational force exerted upon said block and lever.

5. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count, said counter including a plurality of dials rotatable by a gear train, said gear train being operatively connected to said lever, said gear train and dials having an inertia to rotational displacement, and a dashpot mounted on said support, said dashpot having a piston movable in an air chamber, linkage means connecting said piston, mass and lever to move simultaneously in said one direction when the accelerating force is applied, said dashpot having a damping characteristic effective in conjunction with the combined inertia of said mass, lever, dials and gear train to determine the maximum frequency at which said lever may be displaced by repeated accelerating forces substantially independently of any vertically directed gravitational force exerted upon said block and lever.

6. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count, said counter including a plurality of dials rotatable by a gear train, said gear train being operatively connected to said lever, said gear train and dials having an inertia to rotational displacement, and a dashpot mounted on said support, said dashpot having a piston movable in an air chamber, linkage means connecting said piston, mass and lever to move simultaneously in said one direction when the accelerating force is applied, said dashpot having a damping characteristic effective in conjunction with the combined inertia of said mass, lever, dials and gear train to determine the maximum frequency at which said lever may be displaced by repeated accelerating forces, said magnet being axially adjustable in said support so that the spacing of the magnet from the block and lever may be set to predetermine the minimum magnitude of accelerating force required to completely displace said lever and mass in said one direction substantially independently of any vertically directed gravitational force exerted upon said block and lever.

7. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count, and a dashpot mounted on said support, said dashpot having a piston movable in an air chamber, linkage means connecting said piston, mass and lever to move simultaneously in said one direction when the accelerating force is applied, said dashpot having a damping characteristic effective in conjunction with inertia of said mass and lever to determine the maximum frequency at which said lever may be displaced by repeated accelerating forces, an electrical shorting member carried by said linkage means, and spaced fixed electrical contacts mounted on said support for simultaneous contact by said shorting member when said lever and mass are displaced by the accelerating force substantially independently of any vertically directed gravitational force exerted upon said block and lever.

8. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count, said counter including a plurality of dials rotatable by a gear train, said gear train being operatively connected to said lever, said gear train and dials having an inertia to rotational displacement, and a dashpot mounted on said support, said dashpot having a piston movable in an air chamber, linkage means connecting said piston, mass and lever to move simultaneously in said one direction when the accelerating force is applied, said dashpot having a damping characteristic effective in conjunction with the combined inertia of said mass, lever, dials and gear train to determine the maximum frequency at which said lever may be displaced by repeated accelerating forces, an electrical shorting member carried by said linkage means, and spaced fixed electrical brushes mounted on said support and insulated therefrom, said brushes being simultaneously contacted and electrically connected by said shorting member when said lever and mass are displaced by an accelerating force substantially independently of any vertically directed gravitational force exerted upon said block and lever.

9. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count, said counter including a plurality of dials rotatable by a gear train, said gear train being operatively connected to said lever, said gear train and dials having an inertia to rotational displacement, a dashpot mounted on said support, said dashpot having a piston movable in an air chamber, linkage means connecting said piston, mass and lever to move simultaneously in said one direction when the accelerating force is applied, said dashpot having a damping characteristic effective in conjunction with the combined inertia of said mass, lever, dials and gear train to determine the maximum frequency at which said lever may be displaced by repeated accelerating forces, and an electrical shorting member carried by said linkage means, and spaced fixed electrical brushes mounted on said support and insulated therefrom, said brushes being simultaneously contacted and electrically connected by said shorting member when said lever and mass are displaced by an accelerating force, said shorting member, linkage means and brushes having frictional engagement supplementing the damping characteristic of the dashpot in predetermining said maximum frequency substantially independently of any vertically directed gravitational force exerted upon said block and lever.

10. In a shock register, a support, a mechanical digital counter mounted on said support, said counter having a pivotable actuating lever to advance the counter a single count each time the lever is pivoted fully in one direction and then pivoted fully in a reverse direction, a massive block secured to said lever, a magnet carried by said support and spaced from said block and lever, said magnet normally attracting the lever to move pivotally in said reverse direction and holding the lever at the end of its pivotal movement in said reverse direction, whereby an accelerating force applied in said one direction pivots the lever and the magnet retracts the lever when said force ceases to advance the counter count, said counter including a plurality of dials rotatable by a gear train, said gear train being operatively connected to said lever, said gear train and dials having an inertia to rotational displacement, a dashpot mounted on said support, said dashpot having a piston movable in an air chamber, linkage means connecting said piston, mass and lever to move simultaneously in said one direction when the accelerating force is applied, said dashpot having a damping characteristic effective in conjunction with the combined inertia of said mass, lever, dials and gear train to determine the maximum frequency at which said lever may be displaced by repeated accelerating forces, said dashpot having a tapered air passage opening into said chamber and communicating with the exterior of the dashpot, and a valve member having a tapered end adjustably movable in said tapered air passage to regulate flow of air through said air passage into and out of the air chamber for adjusting said damping characteristic substantially independently of any vertically directed gravitational force exerted upon said block and lever.

References Cited in the file of this patent

UNITED STATES PATENTS

| 2,244,417 | Bacon | June 3, 1941 |
|---|---|---|
| 2,272,478 | Poole | Feb. 10, 1942 |
| 2,293,234 | Winter | Aug. 18, 1942 |

FOREIGN PATENTS

| 702,696 | Germany | Feb. 13, 1941 |